UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ARC-LAMP ELECTRODE.

1,082,978.  Specification of Letters Patent.  Patented Dec. 30, 1913.

No Drawing.  Application filed December 10, 1903. Serial No. 184,669.

*To all whom it may concern:*

Be it known that I, CHARLES P. STEINMETZ, a citizen of the United States, residing at Schenectady, county of Schenectady, State of New York, have invented certain new and useful Improvements in Arc-Lamp Electrodes, of which the following is a specification.

The object of my present invention is to improve the operation and increase the efficiency of arc lamps by improving the light-giving qualities of the electrodes employed.

As is well known in an arc lamp employing the ordinary form of electrodes made out of carbon, the bulk of the light emitted is due to the incandescence of one or both of the electrodes rather than to the luminosity of the arc itself. I have found however that if titanium, either in the pure state or in the form of a chemical compound such as titanium carbid or oxid, is introduced into an ordinary carbon electrode employed in conjunction with a similar electrode, or with an ordinary carbon electrode to which no such matter has been added, a luminous arc yielding intense white light may be obtained.

In direct current lamps I ordinarily employ the electrode containing carbon and titanium as the positive electrode in conjunction with a negative electrode composed of carbon. The titanium is preferably employed in the positive electrode because the higher temperature of the positive causes a more ready vaporization of the titanium into the arc. In alternating current lamps the presence of titanium in but one of the electrodes is sufficient, it not being necessary that both electrodes should contain titanium.

In the construction of these electrodes, carbon and the titanium may be mixed together to form a powdered mass from which electrodes may be formed in the manner employed in making ordinary carbon electrodes. The ratio of the titanium to the carbon in the electrode may vary somewhat according to the dimensions of the electrode, current employed, or other conditions of use. The amount of titanium in the electrode should be sufficient to insure the presence in the arc of a sufficient supply of vapors containing titanium to properly color it and add to its luminosity. Titanium should not be present in such amount however that it will not be consumed by the arc as rapidly as the carbon. The presence of titanium in excess of this amount results in the accumulation of titanium at the electrode tip which is or may be objectionable.

When on account of the low current employed, or for other reasons, the electrode is but slowly consumed the percentage of titanium or titanium compound should be considerably higher than where the electrode is comparatively rapidly consumed. In general however the percentage of titanium in the electrode will be small, in some cases not more than two or three per cent.

In an arc formed between electrodes containing the constituents above specified, the vaporized carbon forms the principal agent for carrying the current between the electrodes. Such an arc therefore possesses the characteristic features of the carbon arc, including inherent stability. At the same time the presence of the titanium vaporized into the arc gives it a very desirable white color and materially increases its luminosity.

What I claim as new, and desire to secure by Letters Patent of the United States, is,—

An arc light electrode yielding a luminous white arc, composed of carbon associated with titanium carbid or its described equivalents.

In witness whereof I have hereunto set my hand this 7th day of December, 1903.

CHARLES P. STEINMETZ.

Witnesses:
BENJAMIN B. HULL,
BURTON C. ANTHONY.